US008320481B2

(12) United States Patent
Jin (10) Patent No.: US 8,320,481 B2
(45) Date of Patent: Nov. 27, 2012

(54) SYNCHRONIZATION METHOD AND APPARATUS FOR ORTHOGONAL FREQUENCY DIVISION MULTIPLEXING SYSTEM (75) Inventor: Hua-Feng Jin, Beijing (CN)

(73) Assignee: VIA Telecom, Inc., San Diego, CA (US)

( * ) Notice: Subject to any disclaimer, the term of this patent is extended or adjusted under 35 U.S.C. 154(b) by 862 days.

(21) Appl. No.: 12/468,073

(22) Filed: May 19, 2009

(65) Prior Publication Data
US 2010/0246698 A1 Sep. 30, 2010

(30) Foreign Application Priority Data

Mar. 26, 2009 (CN) .......................... 2009 1 0129830

(51) Int. Cl.
H04L 27/28 (2006.01)
H04L 27/00 (2006.01)
(52) U.S. Cl. ....................................... 375/260; 375/316
(58) Field of Classification Search .................. 375/260, 375/316, 355, 354; 370/206, 208
See application file for complete search history.

(56) References Cited

U.S. PATENT DOCUMENTS
5,732,113 A * 3/1998 Schmidl et al. ............... 375/355

FOREIGN PATENT DOCUMENTS
CN 1913509 2/2007

OTHER PUBLICATIONS

Article Titled "Robust frequency and timing synchronization for OFDM" jointly authored by Schmidl et al. in IEEE Transactions on Communications, vol. 45, No. 12, Dec. 1997 (pp. 1613-1621).
Article Titled "An efficient frequency offset estimator for OFDM systems and its performance characteristics" jointly authored by Kim et al. in IEEE Transactions on Vehicular Technology, vol. 50, No. 5, Sep. 2001 (pp. 1307-1312).
Article Titled "On Timing Offset Estimation for OFDM System" jointly authored by Zeng et al. in IEEE Communications Letters, vol. 4, No. 7, Jul. 2000 (pp. 242-244).
Article Titled "A Novel Timing Estimation Method for OFDM Systems" jointly authored by Park et al. in IEEE Communications Letters, vol. 7, No. 5, May 2003 (pp. 239-241).
Article Titled "Timing and Frequency Synchronization Method for Wireless OFDM Systems" jointly authored by Ren et al. in Journal of Xidian University, vol. 32 No. 5, Oct. 2005 (pp. 758-761;p. 817).

* cited by examiner

Primary Examiner — Khai Tran
(74) Attorney, Agent, or Firm — Jianq Chyun IP Office (57) ABSTRACT A synchronization method used in a receiving terminal of an orthogonal frequency division multiplexing (OFDM) system is illustrated. The synchronization method includes following steps: (a) receiving an OFDM training symbol at the receiving terminal, wherein the OFDM training symbol includes many sample points; (b) calculating first function values according to the sample points by using a first function; (c) selecting D timing points from many timing points corresponding to the first function values, wherein D first function values of the D timing points are larger than a first threshold value; (d) calculating D second function values of the D timing points by using a second function; and (e) selecting a first timing point from the D timing points, and setting the first timing point as a timing synchronization point, wherein the second function value of the first timing point is a first one greater than a second threshold value.

18 Claims, 4 Drawing Sheets

SYNCHRONIZATION METHOD AND APPARATUS FOR ORTHOGONAL FREQUENCY DIVISION MULTIPLEXING SYSTEM

CROSS-REFERENCE TO RELATED APPLICATION

This application claims the priority benefit of China application serial no. 200910129830.3, filed Mar. 26, 2009. The entirety of the above-mentioned patent application is hereby incorporated by reference herein and made a part of specification.

BACKGROUND OF THE INVENTION

1. Field of the Invention

The present invention relates to an orthogonal frequency division multiplexing (OFDM) system. More particularly, the present invention relates to a synchronization method and a synchronization apparatus of an OFDM system.

2. Description of Related Art

OFDM is an efficient modulation mechanism. In general, two transmission methods (i.e., a single carrier modulation method and a multi-carrier modulation method) are mainly used in a communication system under the limitation of a fixed bandwidth. The multi-carrier transmission means that a user can send and receive signals simultaneously by a plurality of sub-carriers. The basic concept of the OFDM transmission technique lies in that a single high-speed datum is transmitted in a lower transmission rate by a plurality of orthogonal sub-carriers.

Since a high transmission rate is achieved by applying the OFDM technique, and an issue of frequency selective fading channel is effectively resolved by applying the OFDM technique as well, the OFDM technique has been widely applied in various wireless communication systems. However, the OFDM system is sensitive to a timing offset and a frequency offset which easily result in crosstalk among carriers. Hence, precise estimation and compensation of the frequency offset and the timing offset are very important, and synchronization thereby becomes an important subject in the OFDM system.

In the OFDM system, synchronization is generally classified into a non-data-aided algorithm and a data-aided algorithm. In a conventional data-aided algorithm, the most basic synchronization method was proposed by Schmidl. Specifically, according to Schmidl, two particular structure training symbols are used to synchroniously estimate the timing offset and the frequency offset (referring to SCHMIDL T M, COX D C. Robust frequency and timing synchronization for OFDM [J]. IEEE Trans. Commun., 1997, 45(12):161321621). In the synchronization method, a Schmidl decision function is adopted to find a timing point corresponding to the maximum function value, and then the timing point is set as a timing synchronization point.

In addition, in order to reduce burden of the system, Y. H. Kim proposed an improved method of timing synchronization and frequency synchronization by using a single training symbol according to the above-mentioned method proposed by Schmidl (referring to KIM Yun Hee. An efficient frequency offset estimator for OFDM systems and its performance characteristics [J]. IEEE Transactions on Vehicular Technology, 2001 50(5):130721312). However, since the above-mentioned two methods are both affected by cyclic prefix (CP) which results in large timing estimation errors, Minn proposed another method of timing synchronization and frequency synchronization as a modification to Schmidl's approach (referring to Minn H, Zeng M, Bhargava V K. On Timing Offset Estimation for OFDM System [J]. IEEE Comm Lett, 2000, 4 (7):2422244).

Nevertheless, because Minn's method does not accomplish precision to a great extent under a multi-path channel, Park designed another new synchronization training symbol, i.e., Park training symbol, and proposed a method of timing synchronization and frequency synchronization according to the Park training symbol so as to enhance the precision of the timing estimation and the frequency estimation (referring to Park B, Cheon H, Kang C, et al. A Novel Timing Estimation Method for OFDM Systems [J]. IEEE Comm Lett, 2003, 7(5):2392241). However, since a secondary peak value respectively exists at two sides of the peak value of a correct decision point, a timing decision point may be affected by the two secondary peak values under the multi-path channel.

On the other hand, since the Park training symbol designed by Park simply provides an estimation of a symbol synchronization and an estimation of a decimal frequency offset value, if an estimation of an integer frequency offset value is needed, an extra training symbol is required. The Schmidl decision function and the Park decision function are enumerated below.

In a multi-baseband equivalent model of the OFDM system, time domain signals of the multi-baseband modulation at an transmitting terminal of the OFDM system can be represented as:

$$x_n = \frac{1}{\sqrt{N}} \sum_{k=0}^{N-1} X_k \exp(j2\pi kn/N),$$

$$n = 0, 1, \Lambda, N-1,$$

where N is the number of the sub-carriers, and $X_k$ represents the $k_{th}$ sub-carrier after modulated in a frequency domain. Besides, an impulse response (IR) under a multi-path channel can be represented as:

$$h(\tau, t) = \sum_{l=0}^{L-1} h_l(t) \delta(\tau - \tau_l),$$

where L is the number of multi-paths in the channel, and $h_l(t)$ and $\tau_l$ represent the equivalent low-pass impulse response and delay time of the $l_{th}$ path, respectively.

After signals received by a receiving terminal are sampled, the signals in a time domain is:

$$r_n = \exp j\theta_0 \exp(j2\pi\varepsilon n/N) \sum_{l=0}^{L-1} h_l((n-n_\varepsilon)T_s) x_{n-n} + w_n, \qquad (1)$$

where $\theta_0 = -2\pi\varepsilon n_\varepsilon/N$, $n_f = [n_\varepsilon + \tau_l/T_s]$, $n_\varepsilon$ is an unknown symbol timing offset value, $T_s$ is a sampling period, and $w_n$ is the sampling output of the zero-mean additive white Gaussian noise (AWGN). $\varepsilon = 2\varepsilon_l + \varepsilon_F$ is a normalized frequency offset value of the minimum spacing among the sub-carriers, where $\varepsilon_l$ and $\varepsilon_F$ respectively represent a decimal frequency offset value and an integer frequency offset value of the spacing among the sub-carriers. The main purpose of the synchronization is to estimate the symbol timing offset value $n_\varepsilon$ and the normalized frequency offset value ϵ and, by compensation, to reduce or remove influence of the synchronization error on the system performance.

Figure 1:
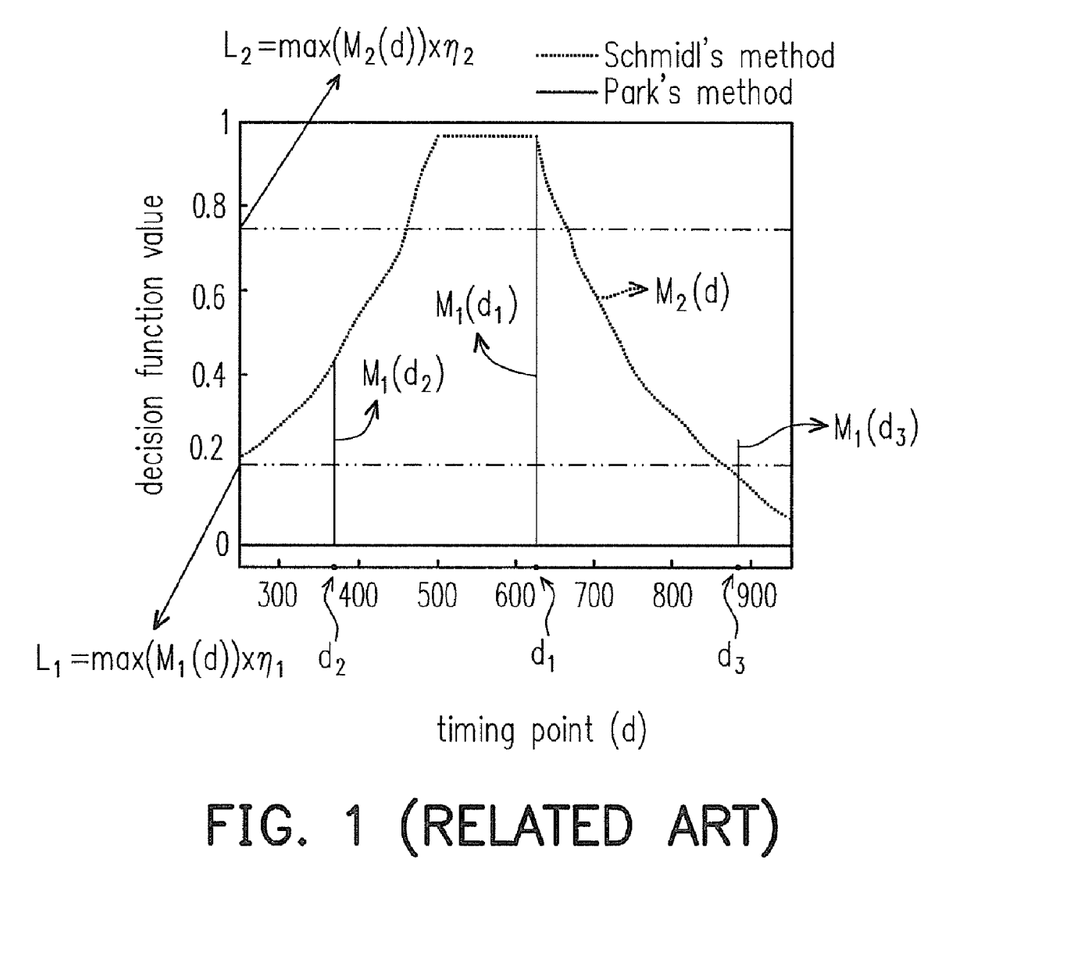
FIG. 1 is a function curve diagram of a Schmidl decision function and a Park decision function.

Referring to FIG. 1, FIG. 1 is a function curve diagram of a Schmidl decision function and a Park decision function. The function curve of the Schmidl decision function $M_2(d)$ is indicated by the dotted lines. In Schmidl's method, theoretically a maximum value of the function values can be obtained within a cyclic prefix region on the premise that the cyclic prefix exists. In a practical system, all of the function values within the region are close to the maximum value, and hence as indicated by the dotted lines in FIG. 1, a plateau which causes a large variance of the timing estimation exists near the timing offset value $n_\epsilon$. In other words, there are many maximum function values in the Schmidl decision function $M_2(d)$, and the maximum function values respectively correspond to different timing points. Since the Schmidl's method sets a timing point corresponding to the maximum function value in the Schmidl decision function $M_2(d)$ as a timing synchronization point, the Schmidl method leads to uncertainty of the timing estimation and results in significant timing estimation errors so as to affect the performance of the symbol timing estimation.

In order to enhance the performance of the symbol timing synchronization, Park designed a new training symbol and proposed a method of symbol timing synchronization based on the training symbol. The function curve of the Park decision function is indicated by the real lines shown in FIG. 1. In a Gaussian channel, a peak value $M_1(d_1)$ of the Park decision function $M_1(d)$ in a correct staring point of the training symbol is far greater than those in other points. Hence, the Park decision function $M_1(d)$ eliminates the plateau region which appears in the conventional Schmidl decision function $M_2(d)$, so that more precise estimation of the symbol synchronization is achieved. However, because of the special optical characteristics of the Park training symbol and the influence of the cyclic prefix, secondary peak values $M_1(d_2)$ and $M_1(d_3)$ exist respectively at two sides of the correct decision point dl. As a result, the secondary peak values $M_1(d_2)$ and $M_1(d_3)$ affect the accuracy of the timing decision in a multi-path channel.

Due to an inter-symbol interference in the multi-path channel, it is known from formula (1) when the delay time of i (i<L) paths are all shorter than $T_S$, given that the signal received by the receiving terminal has a sampling position which lets $n_i=[n_\epsilon+\tau_i/T_s]$, and an impulse response of an OFDM training symbol is time-invariance, the received signal is represented as:

$$r_k = \exp j\theta_0 \exp(j2\pi\epsilon k/N)\begin{pmatrix} h_0 x_{k-n_\epsilon} + \sum_{l=1}^{i} h_l x_{k-n_\epsilon-1} + \\ \sum_{l=i+1}^{L-1} h_l x_{k-n_l} \end{pmatrix} + w_k \quad (2)$$

$$r_{k+1} = \exp j\theta_0 \exp(j2\pi\epsilon(k+1)/N)\begin{pmatrix} h_0 x_{k+1-n_\epsilon} + \\ \sum_{l=1}^{i} h_l x_{k-n_\epsilon} + \\ \sum_{l=i+1}^{L-1} h_l x_{k+1-n_l} \end{pmatrix} + w_{k+1} \quad (3)$$

When the formulas (2) and (3) are compared, if $$\sum_{l=1}^{i} h_l > h_0$$

is satisfied, then the energy $x_{k-n_\epsilon}$ of the $r_{k+1_{th}}$ is larger than the energy of the $r_{k_{th}}$ sampling value. Hence, the position of the peak value $M_1(d_1)$ shifts away from the correct decision point $d_1$, thus resulting in a decision failure and reduction in precision of the timing estimation. However, if a decision is made by reducing a threshold value, more serious miscarriage of justice occur because of the secondary peak value $M_1(d_2)$ and $M_1(d_3)$. In addition, since the estimations of the frequency offset values proposed in the Park's method and in the Schmidl's method are similar, i.e., estimating the frequency offset value according to the training symbol repeated back and forth in the time domain, only a decimal frequency offset value can be estimated, and hence the estimation range of the frequency offset value is limited.

SUMMARY OF THE INVENTION

An exemplary embodiment of the present invention provides a synchronization method used in a receiving terminal of an orthogonal frequency division multiplexing (OFDM) system. The synchronization method includes steps as follows. (a) receiving an OFDM training symbol at the receiving terminal, wherein the OFDM training symbol includes a plurality of sample points; (b) calculating a plurality of first function values according to the sample points by using a first function; (c) selecting D timing points from a plurality of timing points corresponding to the first function values, wherein the D first function values of the D timing points are all greater than a first threshold value, and D is a positive integer representing the number of the selected timing points; (d) calculating D second function values of the D timing points by using a second function; and (e) selecting a first timing point from the D timing points, and setting the first timing point as a timing synchronization point, wherein the second function value of the first timing point is a first one greater than a second threshold value.

An exemplary embodiment of the present invention provides a synchronization apparatus used in a receiving terminal of an orthogonal frequency division multiplexing (OFDM) system.

The synchronization apparatus includes a receiving unit and a timing synchronization unit. The receiving unit receives an OFDM training symbol, wherein the OFDM training symbol includes a plurality of sample points. The timing synchronization unit is coupled to the receiving unit, and the timing synchronization unit includes a first function-calculating unit and a second function-calculating unit. A first function-calculating unit calculates a plurality of first function values according to the sample points by using a first function and selects D timing points from a plurality of timing points corresponding to the first function values, wherein the D first function values of the D timing points are greater than a first threshold value, and D is a positive integer representing the number of the selected timing points. The second function-calculating unit is coupled to the first function-calculating unit. The second function-calculating unit calculates D second function values of the D timing points by using a second function. Next, the second function-calculating unit selects a first timing point from the D timing points, and sets the first timing point as a timing synchronization point, wherein the second function value of the first timing point is a first one greater than a second threshold value.

An exemplary embodiment of the present invention provides an OFDM system. The OFDM system includes a receiving terminal and a transmitting terminal, wherein the transmitting terminal is configured to generate an OFDM training symbol. The receiving terminal includes a receiving unit and a timing synchronization unit. The receiving unit receives an OFDM training symbol, wherein the OFDM training symbol includes a plurality of sample points. The timing synchronization unit is coupled to the receiving unit and includes a first function-calculating unit and a second function-calculating unit. A first function-calculating unit calculates a plurality of first function values according to the sample points by using a first function and selects D timing points from a plurality of timing points corresponding to the first function values, wherein the D first function values of the D timing points are greater than a first threshold value, and D is a positive integer representing the number of the selected timing points. The second function-calculating unit is coupled to the first function-calculating unit. The second function-calculating unit calculates D second function values of the D timing points by using a second function. Next, the second function-calculating unit selects a first timing point from the D timing points, and sets the first timing point as a timing synchronization point, wherein the second function value of the first timing point is a first one greater than a second threshold value.

Based on the above-mentioned descriptions, the exemplary embodiments of the present invention provide the synchronization method, the synchronization apparatus of the OFDM system, and the OFDM system, so that the precision of estimating a timing offset value and a frequency offset value can be enhanced. Namely, the precision of symbol-synchronization can be improved as well. In addition, the estimated range of the frequency offset value can further be further broadened by the method of estimating the integer frequency offset value with high precision, which is provided by the exemplary embodiments of the present invention.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 2A:
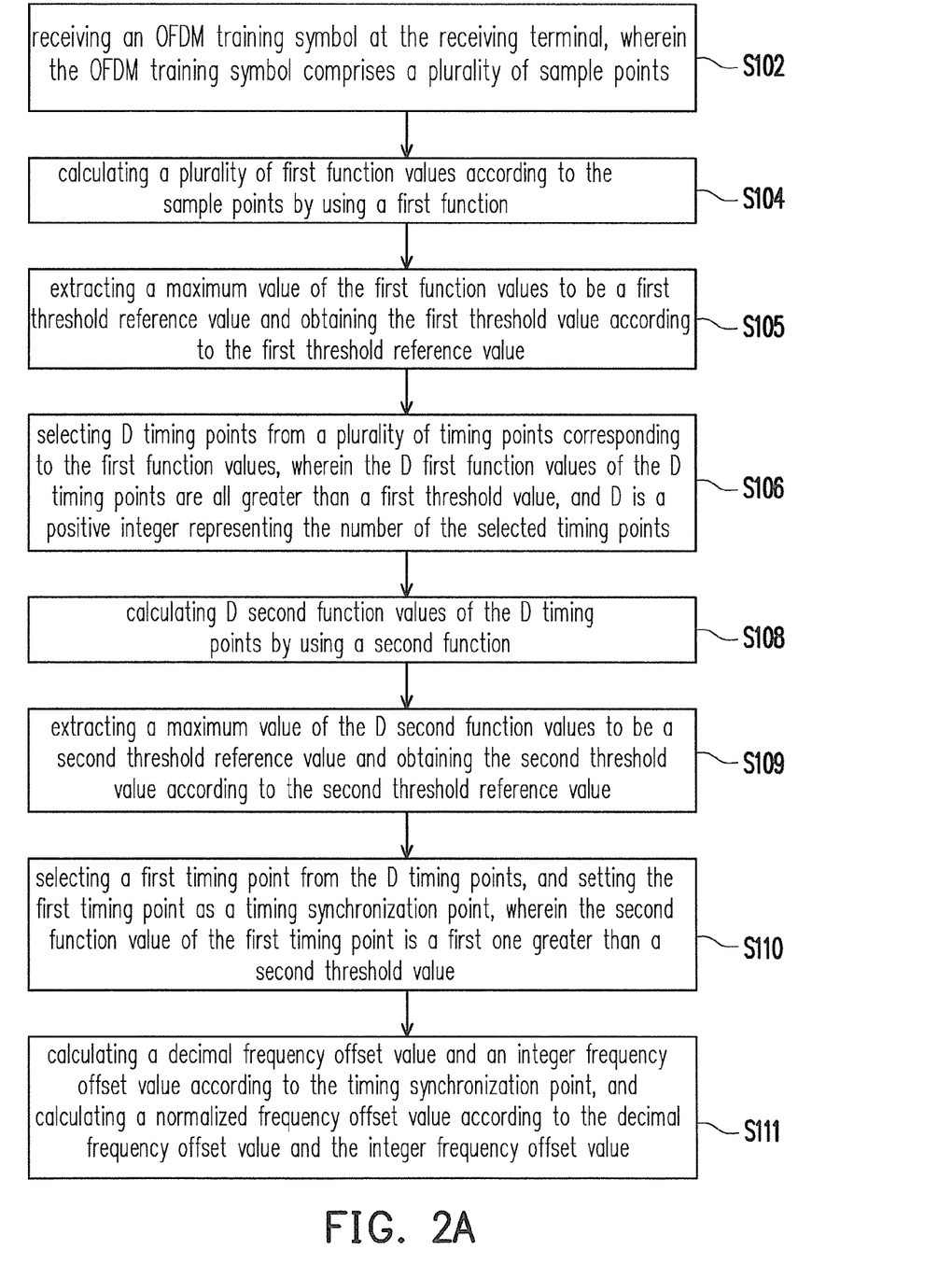
FIG. 2A is a flow chart of a synchronization method according to an exemplary embodiment of the present invention.

DESCRIPTION OF EMBODIMENTS refer to FIG. 2A. FIG. 2A is a flow chart of a synchronization method according to an exemplary embodiment of the present invention. The synchronization method is suitable for being used in a receiving terminal of an OFDM system. As shown in FIG. 2A, the synchronization method of the exemplary embodiment of the present invention mainly includes the following steps. First, an OFDM training symbol is received by the receiving terminal, wherein the OFDM training symbol includes a plurality of sample points (step S102). Next, a plurality of first function values are calculated according to the sample points by using a first function (step S104). In the exemplary embodiment of the present invention, the first function is a Park decision function $M_1(d)$. However, it is apparent that one of ordinary skills in the art can choose another type decision function as the first function according to other embodiments of the present invention, such as a Schmidl decision function.

Thereafter, D timing points are selected from a plurality of timing points corresponding to the first function values, wherein the D first function values of the D timing points are all greater than a first threshold value (step S106). It is noted that, in the exemplary embodiment of the present invention, the synchronization method can further include step S105. Namely, before the step S106 is performed, the maximum value $Max(M_1(d))$ of the first function values is extracted to be a first threshold reference value $R_1$ by which a first threshold value $L_1$ is obtained (step S105). The first threshold value $L_1$ is obtained by multiplying the first threshold reference value $R_1$ and a first multiplying coefficient $\eta_1$. The first multiplying coefficient $\eta_1$ is an arbitrary number greater than 0, and smaller than or equal to 1.

Referring FIG. 2A, after the step S106, D second function values of the D timing points are calculated by using a second function (step S108). In the exemplary embodiment of the present invention, the second function is a Schmidl decision function $M_2(d)$. However, it is apparent that one of ordinary skills in the art can choose another type decision function as the first function according to other embodiments of the present invention, such as the Park decision function. Finally, a first timing point from the D timing points is selected and the first timing point is set as a timing synchronization point $d_1$, wherein the second function value of the first timing point is a first one greater than a second threshold value $L_2$. (step S110).

It is noted that, in the exemplary embodiment of the present invention, the synchronization method can further include step S109. Namely, before the step S110 is performed, the maximum value $Max(M_2(d))$ of the D second function values is extracted to be a second threshold reference value $R_2$, and the second threshold value $L_2$ is obtained according to the second threshold reference value $R_2$ (step S109). The second threshold value $L_2$ is obtained by multiplying the second threshold reference value $R_2$ and a second multiplying coefficient $\eta_2$. The second multiplying coefficient $\eta_2$ is an arbitrary number greater than 0, and smaller than or equal to 1. Besides, the synchronization method of the exemplary embodiment of the present invention can further include step S111. Namely, after the step S110 is performed, according to the timing synchronization point $d_1$, a decimal frequency offset value $\epsilon_F$ and an integer frequency offset value $\epsilon_I$ are calculated, and according to the decimal frequency offset value $\epsilon_F$ and the integer frequency offset value $\epsilon_I$, a normalized frequency offset value is calculated (step S111).

It should be noted that, in the aforementioned synchronization method provided by the exemplary embodiment of the present invention, if the channel is a static channel, and the normalized frequency offset value is not required, then the step S111 can be removed. In addition, if another method is adopted to obtain the first threshold value and the second threshold value, or if the first threshold value and the second threshold value can be preset by a user, the step S105 and the step S109 can also be removed, or other steps can be performed.

Figure 2B:
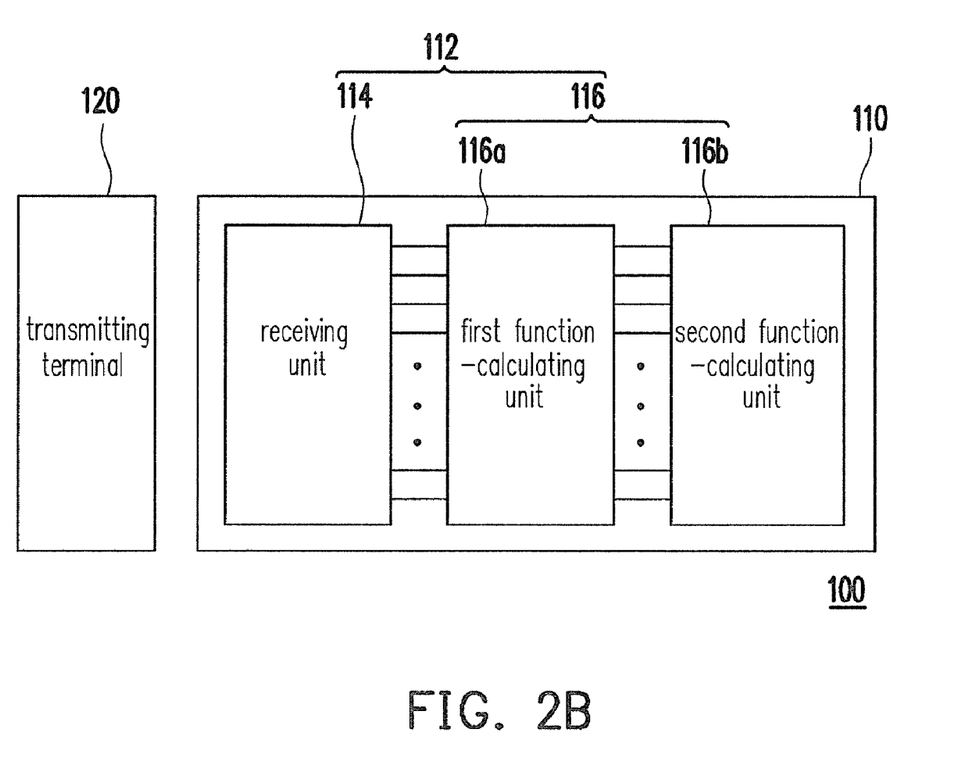
FIG. 2B is a block diagram of an OFDM system according to an exemplary embodiment of the present invention.

Referring to FIG. 2B. FIG. 2B is a block diagram of an OFDM system according to an exemplary embodiment of the present invention. It is noted that, a synchronization method adopted in the OFDM system according to FIG. 2B is the synchronization method according to FIG. 2A. Referring to both FIG. 2A and FIG. 2B, an OFDM system 100 as shown in FIG. 2B includes a receiving terminal 110 and a transmitting terminal 120. The receiving terminal 110 includes a synchronization apparatus 112 which includes a receiving unit 114 and a timing synchronization unit 116. The receiving unit 114 receives an OFDM training symbol, wherein the OFDM training symbol includes N sample points, and N is a positive integer greater than 1 here (i.e. step S102).

It is noted that, in the exemplary embodiment of the present invention, the OFDM training symbol is a Park training symbol, and the preceding and following N/2 sample points of the OFDM training symbol are equal. Besides, only sub-carriers of the Park training symbol which are assigned with even numbers have values. Hence, the OFDM training symbol in the exemplary embodiment is represented as:

$$X_{TS}=[X_0, 0, X_2, 0, \ldots, X_{2i}, 0, \ldots, X_{N-2}, 0], i=0, 1, \ldots N/2-1,$$

where $X_{2i}$ is a real number representing data of the Park training symbol in a frequency domain. In addition, in order to estimate an integer frequency offset value $\epsilon_I$, $X_{2i}$ is composed of pseudo noise (PN) codes, i.e. a pseudo-random sequence with value +1 or −1. Besides, the data of the Park training symbol in the frequency domain are known in the receiving terminal 110.

Referring both FIG. 2A and FIG. 2B, the timing synchronization unit 116 is coupled to the receiving unit 114 and includes a first function-calculating unit 116a and a second function-calculating unit 116b. The first function-calculating unit 116a uses a first function (the Park decision function $M_1(d)$ to calculate N first function values according to the N sample points (i.e. step S104). More detailed descriptions are illustrated as below.

After performing an inverse discrete Fourier transformation (IDFT) on the data $X_{2i}$ of the Park training symbol in the frequency domain, data $x_k$ of the Park training symbol in a time domain can be obtained. According to the characteristics of the IDFT, the data $x_k$ of the Park training symbol in the time domain satisfies:

$$x_k = x_{k+N/2}, (0 \leq k \leq (N/2)-1); x_k = x^*_{N-k}, (1 \leq k \leq N/2);$$

$$x_k = x^*_{(N/2)-k}, (0 \leq k \leq N/4); x_{k+N/2} = x^*_{N-k}, (1 \leq k \leq N/4)$$

First, by using the characteristics of the data $x_k = x^*_{N-k}$, $(1 \leq k \leq N/2)$ of the Park training symbol in the time domain, a class A can be decided, and a correct timing synchronization point $d_1$ is certainly included in the class A. The Park decision function is:

$$M_1(d) = |P_1(d)|^2/(c_1(d))^2,$$

where $P_1(d)$ and $c_1(d)$ are respectively indicated as follows:

$$P_1(d) = \sum_{k=1}^{n/2} r(d+k) \cdot r(d+N-k),$$

$$c_1(d) = \frac{1}{2} \sum_{k=0}^{N-1} |r(d+k)|^2.$$

As a result, after the receiving unit 114 receives the Park training symbol, the first function-calculating unit 116a calculates N first function values according to the N sample points of the Park training symbol by using the above-mentioned Park decision function $M_1(d)$. In general, the calculation results are demonstrated by real lines in FIG. 1. As shown in FIG. 1, a sharp main peak value $M_1(d_1)$ and two secondary peak values $M_1(d_2)$ and $M_1(d_3)$ are shown in the calculation results of the Park decision function $M_1(d)$. Since the function value of the correct timing synchronization point $d_1$ may be smaller than the maximum value of the Park decision function, and the function value of the correct timing synchronization point $d_1$ may even be smaller than the two secondary peak values $M_1(d_2)$ and $M_1(d_3)$ in a multi-path channel, the exemplary embodiment defines a first threshold value $L_1$ which is assured to be smaller than the function value of the correct timing synchronization point $d_1$, such that the function value of the correct timing synchronization point $d_1$ can be selected.

Hence, the first function-calculating unit 116a can select three timing points $d_1 \sim d_3$ from N timing points corresponding to the N first function values, wherein the three first function values $M_1(d_1) \sim M_1(d_3)$ of the three timing points $d_1 \sim d_3$ are all greater than the first threshold value $L_1$ (i.e. step S106). In other words, when the first threshold value $L_1$ serves as a basis of making decisions, not only the function value $M_1(d_1)$ corresponding to the correct timing synchronization point $d_1$ is greater than the first threshold value $L_1$, but also the two secondary peak values $M_1(d_2)$ and $M_1(d_3)$ are both greater than the first threshold value $L_1$. In the exemplary embodiment, the maximum value of the Park decision function, i.e. $Max(M_1(d))=M_1(d_1)$, serves as a first threshold reference value $R_1$. Besides, the first threshold value $L_1$ is obtained by multiplying the first threshold reference value $R_1$ and a first multiplying coefficient $\eta_1$, i.e., $L=Max(M_1(d)) \times \eta_1$ (i.e. step S105). Here, the timing points corresponding to the function values which are greater than the first threshold value $L_1$ are defined as the class A. That is, the timing point d∈A, and $M_1(d) > Max(M_1(d)) \times \eta_1$.

Referring to both FIG. 2A and FIG. 2B, the second function-calculating unit 116b is coupled to the first function-calculating unit 116a. The second function-calculating unit 116b calculates three second function values of the three timing points by using the Schmidl decision function (i.e., step S108). Specifically, in step S108, the calculation of the Schmidl decision function $M_2(d)$ is performed on the timing points $d_1 \sim d_3$ in the class A by using the characteristics of the data $x_k = x_{k+N/2}$, $(0 \leq k \leq (N/2)-1)$ of the Park training symbol in the time domain. The Schmidl decision function $M_2(d)$ is:

$$M_2(d) = |P_2(d)|^2/(c_2(d))^2,$$

where $P_2(d)$ and $c_2(d)$ are respectively indicated as follows:

$$P_2(d) = \sum_{k=0}^{(n/2)-1} r(d+k) \cdot r(d+k+N/2),$$

$$c_2(d) = \frac{1}{2}\sum_{k=0}^{N-1} |r(d+k)|^2$$

Referring to FIG. 1, from the calculation results of the Schmidl decision function $M_2(d)$ as indicated by the dotted lines, only the correct timing synchronization point $d_1$ and one or several of the second function values behind the correct timing synchronization point $d_1$ are close to the maximum value of the Schmidl decision function $M_2(d)$ at the timing points $d_1$-$d_3$ of the class A, wherein the one or several second function values are affected by the multi-path channel. Hence, based on the above-mentioned characteristic, a second threshold value $L_2$ is defined, and the correct timing synchronization point $d_1$ can be obtained by selecting a first timing point from the timing points $d_1$~$d_3$, wherein the second function value of the first timing point is a first one greater than a second threshold value $L_2$. (i.e. step S110). So far, the timing estimation of the Park training symbol is completed, and a location of a staring point of the Park training symbol is determined.

In the exemplary embodiment, the maximum value of the Schmidl decision function, i.e., $\text{Max}(M_2(d))=M_2(d_1)$, serves as a second threshold reference value $R_2$. The second threshold value $L_2$ is obtained by multiplying the second threshold reference value $R_2$ and a second multiplying coefficient $\eta_2$, i.e. $L_2=\text{Max}(M_2(d)) \times \eta_2$ (i.e. step S109). Assuming that $$n_\varepsilon' = \arg\max_d(M_1(d)),$$

the value of $M_2(n_e')$ is located on the plateau region of the Schmidl decision function $M_2(d)$ as shown in FIG. 1, and hence the value of $M_2(n_e)$ is close to the maximum value of the Schmidl decision function $M_2(d)$. Accordingly, in the end the timing offset value is:

$$n_\varepsilon = \operatorname*{Minarg}_{d \in A}(M_2(d) \geq M_2(n_\varepsilon') \cdot \eta_2)$$

That is, the timing point corresponding to the first function value greater than $M_2(n_\epsilon') \times \eta_2$ in class A is the timing synchronization point. It is noted that, in the exemplary embodiment, $0<\eta_1 \leq 1$, $0<\eta_2 \leq 1$, and the influence of the two secondary peak values of the Park decision function $M_1(d)$ is eliminated when the first multiplying coefficient $\eta_1$ and the second multiplying coefficient $\eta_2$ are chosen properly. Further, the performance of the timing synchronization can be enhanced. When $\eta_1=1$, the method of the exemplary embodiment is equal to Park method, and since there are few timing points in class A, an increase in the complexity arisen from applying the synchronization method is insignificant.

In addition, according to the exemplary embodiment of the present invention, a decimal frequency offset value $\epsilon_F$ is further estimated based on the repetition property of the Park training symbol, i.e., $x_k=x_{k+N/2}$. The decimal frequency offset value $\epsilon_F$ can be represented as:

$$\varepsilon_F = \frac{\text{angle}(P_2(n_\varepsilon))}{\pi},$$

wherein angle(x) denotes a phase of x.

In the OFDM system, an integer frequency offset results in a cyclic shift of the output data which is obtained by fast fourier transformation (FFT). Namely, the integer multiple of shifted sub-carrier spacing represents the number of shifted bits. Hence, the estimation of the integer frequency offset value FI aims at finding the integer multiple of the shifted sub-carrier spacing. As a result, by using the pseudo-random sequence defined by a transmitting terminal 120, the receiving terminal 110 can perform an operation on the pseudo-random sequence so as to obtain the maximum shift value and define the shift value as an integer frequency offset value $\epsilon_I$. The integer frequency offset value $\epsilon_I$ is represented as follows:

$$\varepsilon_I = \arg\max_{g \in G}(F(g)), G = \{0, 1 \ldots, (N/2)-1\},$$

where F(g) is represented as follows:

$$F(g) = \frac{\left|\sum_{i \in I} X_{2i} Y_{2i+2g}\right|^2}{\left(\sum_{i \in I} |Y_{2i+2g}|^2\right)^2}, I = \{0, 1 \ldots, (N/2)-1\},$$

$Y_{2i+2g}$ is the data of the Park training symbol in the frequency domain after FFT at the receiving terminal 110 is done, and an estimation of the normalized frequency offset value obtained in the end is:

$$\epsilon 2\epsilon_I + \epsilon_F$$

Hence, the estimable range of the frequency offset value can be expanded to be greater than the integer multiple of the sub-carrier spacing.

Figure 3A:
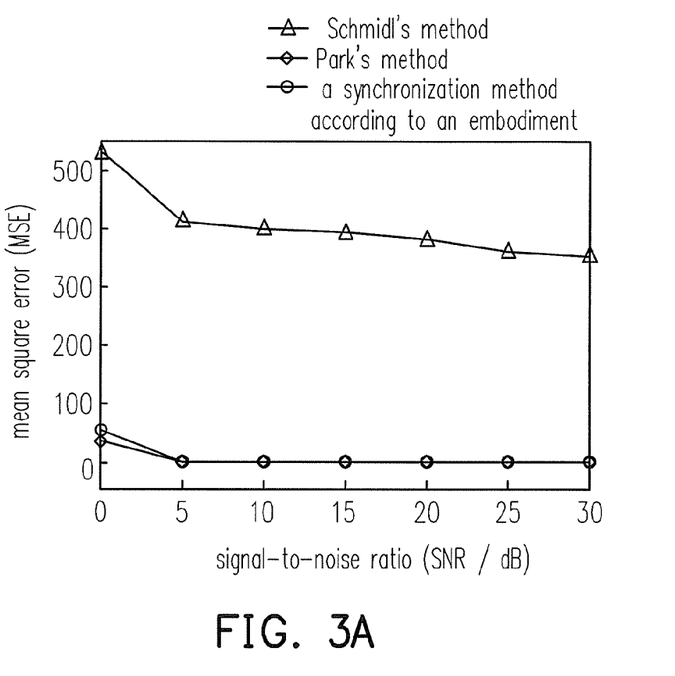
FIG. 3A is a mean square error (MSE) curve diagram illustrating a Park method, a Schmidl method, and a synchronization method according to an exemplary embodiment of the present invention.
Figure 3B:
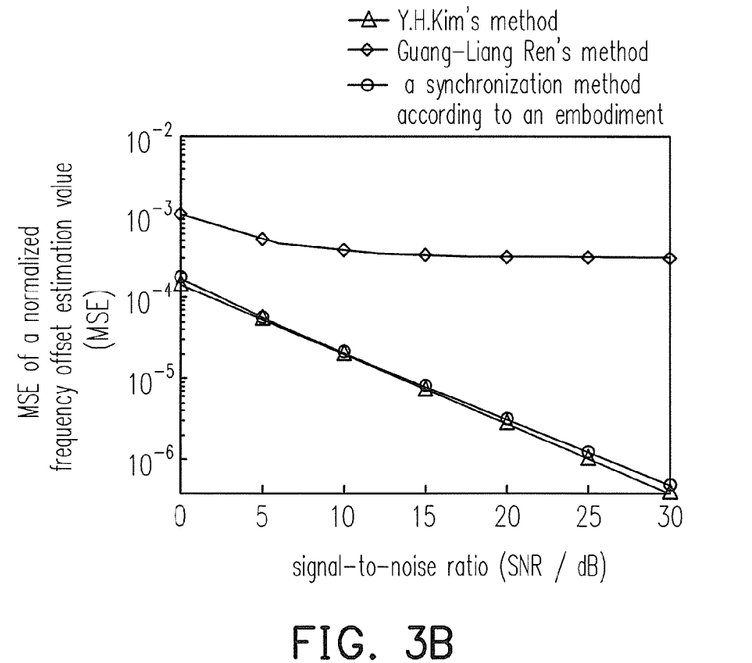
FIG. 3B is a mean square error (MSE) curve diagram of a normalized frequency offset estimation value of a Y. H. Kim's method, a Guang-Liang Ren's method, and a synchronization method according to an exemplary embodiment of the present invention.

In order to compare the performance of different methods, comparison and simulation of algorithms as proposed by Schmidl, Park, Y. H. Kim, and Ren Guang-liang (referring to Ren Guang-liang, Chamg Yi-lin, Timing and frequency synchronization method for wireless OFDM systems, Journal of Xidian University, 2005, 32(5):758-761) are further made in the exemplary embodiment. FIG. 3A is a mean square error (MSE) curve diagram of the Park method, the Schmidl method, and a synchronization method according to an exemplary embodiment of the present invention. FIG. 3B is a MSE curve diagram of a normalized frequency offset estimation value of the Y. H. Kim method, the Ren Guang-liang method, and a synchronization method according to an exemplary embodiment of the present invention.

The simulation results are obtained by performing 10,000 operations respectively at different signal-to-noise ratios (SNRs). Here, assuming that the number of the sample points in the OFDM system is 1024, and the length of a cyclic prefix (CP) is 32 in the exemplary embodiment. Besides, the multi-path channel herein refers to a COST 259 city environment wireless channel model with a maximum path number of 18. The possible range of the frequency offset value may be 1024 times of the sub-carrier spacing in the OFDM system, and a channel correlation time is far longer than a burst transmission time of the OFDM system. The first multiplying coefficient $\eta_1$ is 0.2, and the second multiplying coefficient $\eta_2$ is 0.8. The value of a parameter I of the training symbol is set as 2 when the algorithm of Ren Guang-liang is simulated, and the possible range of the frequency offset value may be 4 times of the sub-carrier spacing in the OFDM system.

As shown in FIG. 3A, the Park's method is better than the Schmidl's method under the multi-path channel. The MSE of the synchronization method of the exemplary embodiment is roughly equal to 0 when SNR>5, while the MSE of the Park method is roughly around 1 sample point. Hence, the synchronization method of the exemplary embodiment is better than the Park method. In addition, as shown in FIG. 3B, when SNR>5, the estimation of the frequency offset value of the synchronization method of the exemplary embodiment is apparently more precise than the estimation of the frequency offset value of the Ren Guang-liang method, and the estimation of the frequency offset value of the synchronization method is almost as precise as that of the Y. H. Kim method. As a result, the synchronization method of the exemplary embodiment can estimate the integer frequency offset value, so that the precision of the estimation of the frequency offset value can be enhanced.

In conclusion, the synchronization method and the synchronization apparatus of the OFDM system in the exemplary embodiments of the present invention aim at modifying Park's method, i.e., selecting a plurality of timing points corresponding to the first function values according to the Park decision function and the first threshold value and, in combination of Schmidl's method, substituting the timing points into the Schmidl decision function so as to decide the correct timing synchronization point according to the second threshold value. Since the synchronization method is characterized by the advantages of both Park's method and Schmidl's method, the timing estimation errors caused by the secondary peak values existing in Park's method and by the plateau region existing in Schmidl's method can be eliminated, so that the precision of timing synchronization can be improved. In addition, because the OFDM synchronization method of the embodiment of the present invention has advantages of Schmidl's method, highly precise estimation of the integer frequency offset value and broad estimated range of the frequency offset value can be realized.

Although the present invention has been described with reference to the above embodiments, it is apparent to one of the ordinary skill in the art that modifications to the described embodiment may be made without departing from the spirit of the invention. Accordingly, the scope of the invention is defined by the attached claims not by the above detailed descriptions.

What is claimed is:

1. A synchronization method used in a receiving terminal of an orthogonal frequency division multiplexing (OFDM) system, the synchronization method comprising:
   receiving an OFDM training symbol at the receiving terminal, wherein the OFDM training symbol comprises a plurality of sample points;
   calculating a plurality of first function values according to the sample points by using a first function;
   selecting D timing points from a plurality of timing points corresponding to the first function values, wherein D first function values of the first function values corresponding to the D timing points are all greater than a first threshold value, and D is a positive integer representing the number of the selected timing points;
   calculating D second function values of the D timing points by using a second function; and
   selecting one of the D timing points, and setting the selected one of the D timing points as a timing synchronization point, wherein the second function value of the selected one timing point is a first one greater than a second threshold value.

2. The synchronization method of claim 1, wherein the first function and the second function are respectively a Park decision function and a Schmidl decision function, or the first function and the second function are respectively a Schmidl decision function and a Park decision function.

3. The synchronization method of claim 1, further comprising:
   extracting a maximum value of the first function values to be a first threshold reference value; and
   obtaining the first threshold value according to the first threshold reference value.

4. The synchronization method of claim 3, wherein the first threshold value is obtained by multiplying the first threshold reference value and a first multiplying coefficient, and the first multiplying coefficient is an arbitrary number greater than 0, and smaller than or equal to 1.

5. The synchronization method of claim 1, further comprising:
   extracting a maximum value of the D second function values to be a second threshold reference value; and
   obtaining the second threshold value according to the second threshold reference value.

6. The synchronization method of claim 5, wherein the second threshold value is obtained by multiplying the second threshold reference value and a second multiplying coefficient, and the second multiplying coefficient is an arbitrary number greater than 0, and smaller than or equal to 1.

7. The synchronization method of claim 1, wherein preceding and following N/2 of the sample points of the OFDM training symbol are equal, and only sub-carriers of the OFDM training symbol assigned with even numbers have values, and the sub-carriers assigned with the even numbers are composed of pseudo noise codes.

8. The synchronization method of claim 1, further comprising:
   calculating a decimal frequency offset value and an integer frequency offset value according to the timing synchronization point; and
   calculating a normalized frequency offset value according to the decimal frequency offset value and the integer frequency offset value.

9. A synchronization apparatus used in a receiving terminal of an orthogonal frequency division multiplexing (OFDM) system, the synchronization apparatus comprising:
   a receiving unit receiving an OFDM training symbol, wherein the OFDM training symbol comprises a plurality of sample points; and
   a timing synchronization unit coupled to the receiving unit and comprising:
      a first function-calculating unit calculating a plurality of first function values according to the sample points by using a first function, and selecting D timing points from a plurality of timing points corresponding to the first function values, wherein D first function values of the first function values corresponding to the D timing points are greater than a first threshold value, and D is a positive integer representing the number of the selected timing points; and
      a second function-calculating unit coupled to the first function-calculating unit, calculating D second function values of the D timing points by using a second function, selecting one of the D timing points, and setting the selected one of the D timing points as a timing synchronization point, wherein the second function value of the selected one timing point is a first one greater than a second threshold value.

10. The synchronization apparatus of claim 9, wherein the first function and the second function are respectively a Park decision function and a Schmidl decision function, or the first function and the second function are respectively a Schmidl decision function and a Park decision function.

11. The synchronization apparatus of claim 9, wherein the first function-calculating unit extracts a maximum value of the first function values to be a first threshold reference value and obtains the first threshold value according to the first threshold reference value.

12. The synchronization apparatus of claim 11, wherein the first threshold value is obtained by multiplying the first threshold reference value and a first multiplying coefficient, and the first multiplying coefficient is an arbitrary number greater than 0, and smaller than or equal to 1.

13. The synchronization apparatus of claim 9, wherein the second function-calculating unit extracts a maximum value of the second function values to be a second threshold reference value and obtains the second threshold value according to the second threshold reference value.

14. The synchronization apparatus of claim 13, wherein the second threshold value is obtained by multiplying the second threshold reference value and a second multiplying coefficient, and the second multiplying coefficient is an arbitrary number greater than 0, and smaller than or equal to 1.

15. The synchronization apparatus of claim 9, wherein preceding and following N/2 of the sample points of the OFDM training symbol are equal, and only sub-carriers of the OFDM training symbol assigned with even numbers have values, and the sub-carriers assigned with the even numbers are composed of pseudo noise codes.

16. The synchronization apparatus of claim 9, further comprising:
a frequency synchronization unit coupled to the timing synchronization unit, calculating a decimal frequency offset value and an integer frequency offset value according to the timing synchronization point, and calculating a normalized frequency offset value according to the decimal frequency offset value and the integer frequency offset value.

17. An orthogonal frequency division multiplexing (OFDM) system, comprising a receiving terminal and a transmitting terminal, wherein the transmitting terminal is configured to generate an OFDM training symbol, and the receiving terminal comprises:
a receiving unit receiving the OFDM training symbol from the transmitting terminal, wherein the OFDM training symbol comprises a plurality of sample points; and
a timing synchronization unit coupled to the receiving unit and comprising:
a first function-calculating unit calculating a plurality of first function values according to the sample points by using a first function, and selecting D timing points from a plurality of timing points corresponding to the first function values, wherein D first function values of the first function values corresponding to the D timing points are greater than a first threshold value, and D is a positive integer representing the number of the selected timing points; and
a second function-calculating unit coupled to the first function-calculating unit, calculating D second function values of the D timing points by using a second function, selecting one of the D timing points, and setting the selected one of the D timing points as a timing synchronization point, wherein the second function value of the selected one timing point is a first one greater than a second threshold value.

18. The OFDM system of claim 17, wherein the receiving terminal further comprises:
a frequency synchronization unit coupled to the timing synchronization unit, calculating a decimal frequency offset value and an integer frequency offset value according to the timing synchronization point, and calculating a normalized frequency offset value according to the decimal frequency offset value and the integer frequency offset value.

* * * * *